Oct. 9, 1923.

F. W. SCHULTE

POWER TRIP

Filed Jan. 4, 1923

Inventor
Frank W. Schulte

WITNESSES

Oct. 9, 1923. 1,470,332
F. W. SCHULTE
POWER TRIP
Filed Jan. 4, 1923 4 Sheets-Sheet 2
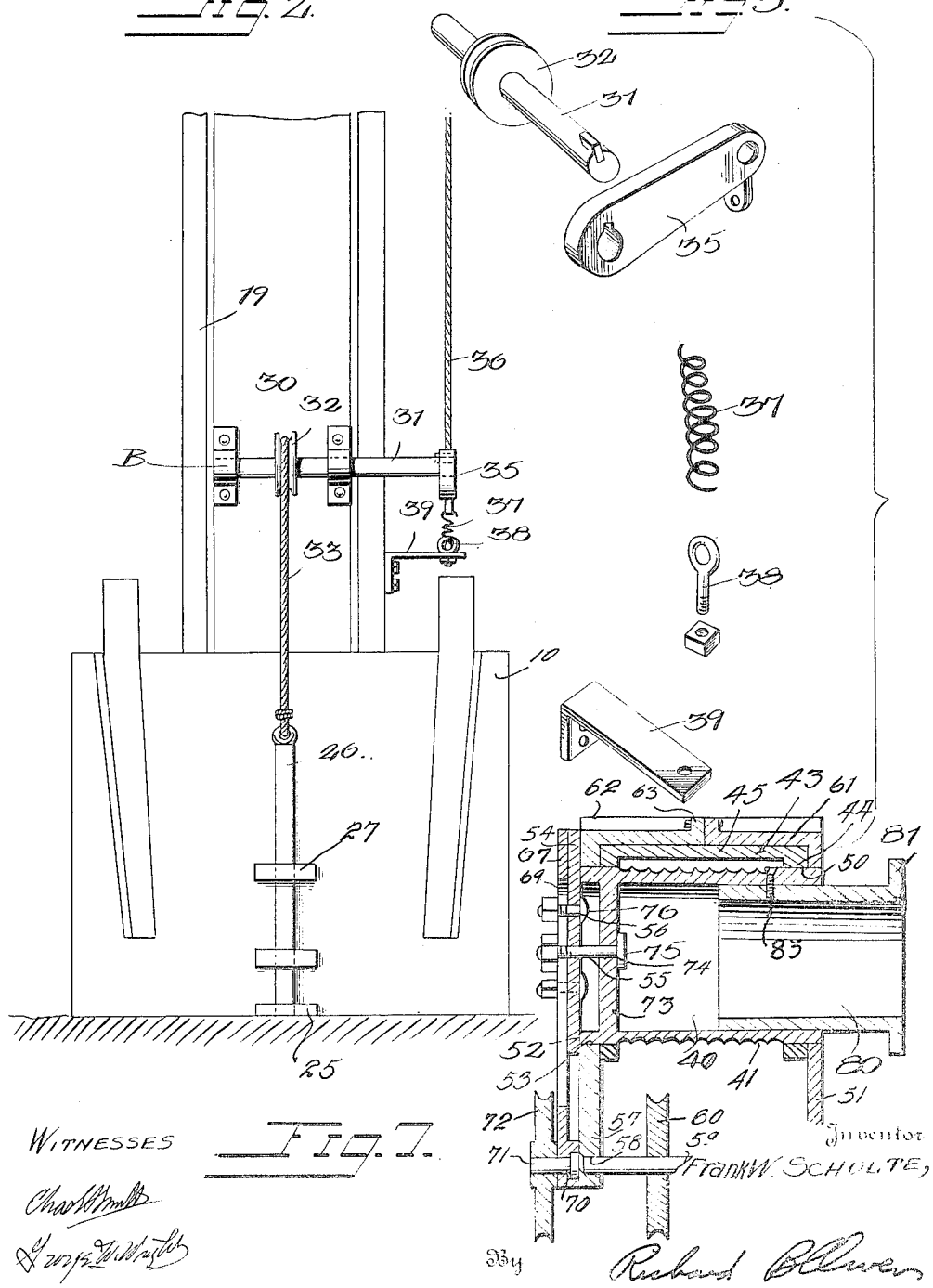

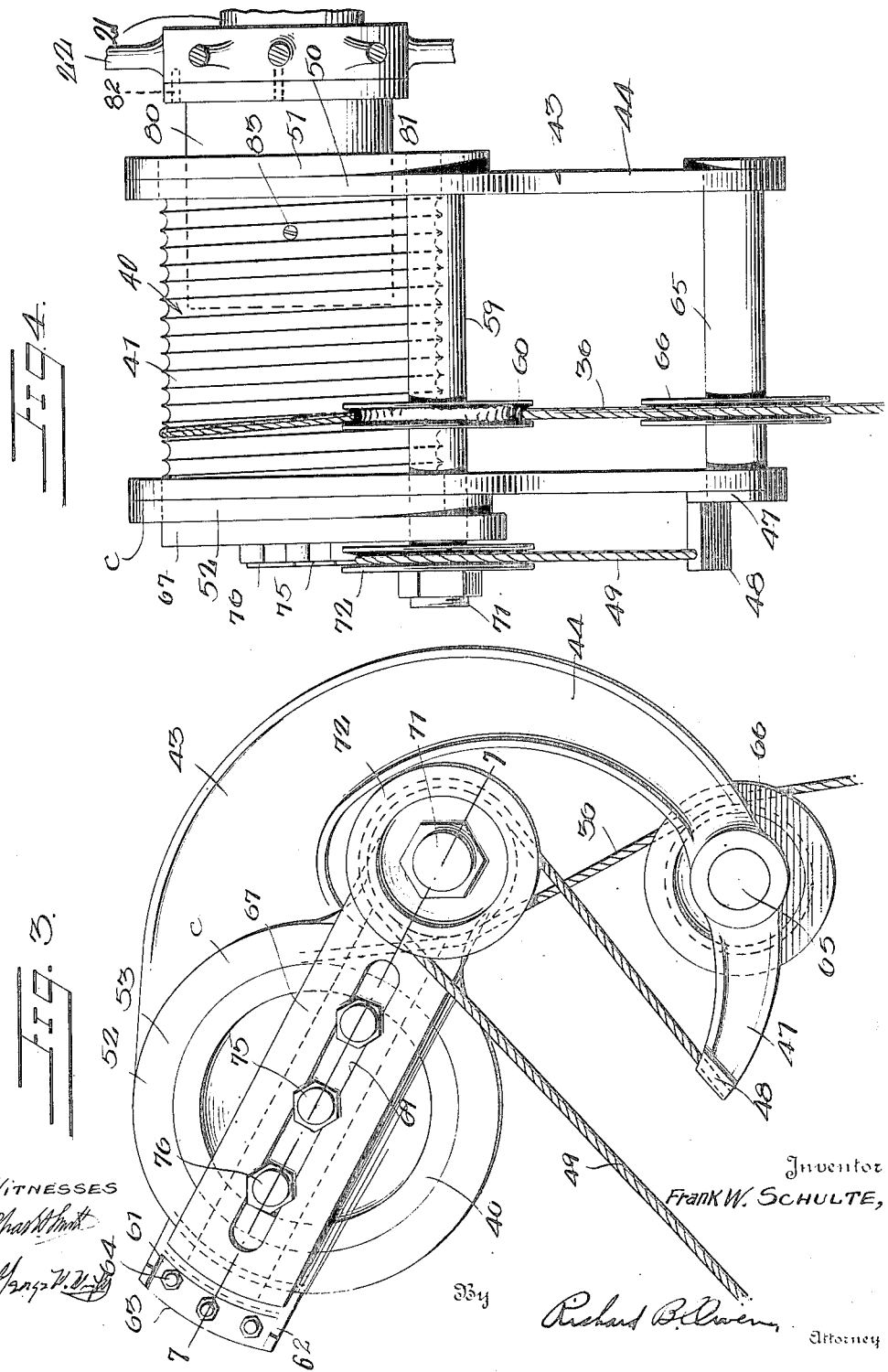

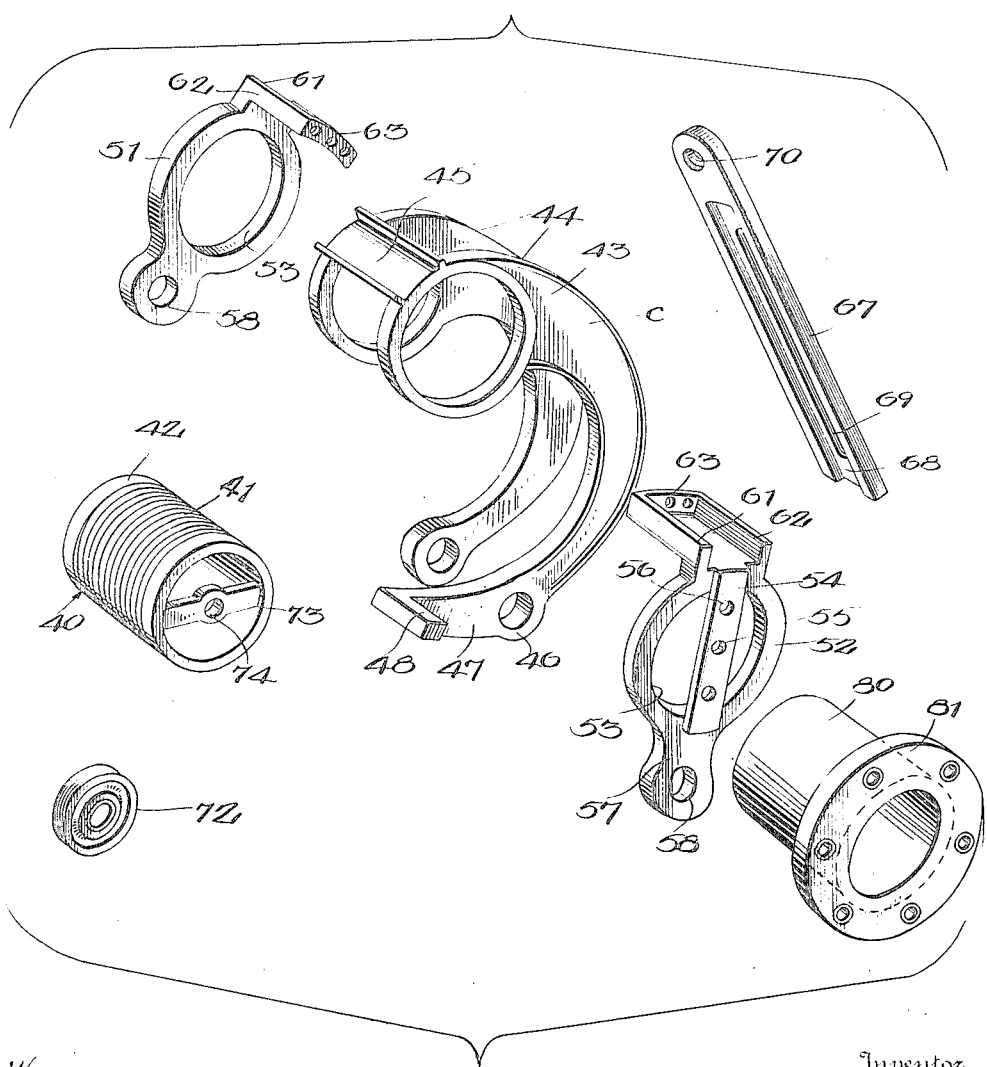

Patented Oct. 9, 1923.

1,470,332

UNITED STATES PATENT OFFICE.

FRANK W. SCHULTE, OF CLARKSBURG, WEST VIRGINIA.

POWER TRIP.

Application filed January 4, 1923. Serial No. 610,660.

*To all whom it may concern:*

Be it known that I, FRANK W. SCHULTE, a citizen of the United States, residing at Clarksburg, in the county of Harrison and State of West Virginia, have invented certain new and useful Improvements in a Power Trip, of which the following is a specification.

This invention relates to excavating machine and more particularly to that type of excavating machine commonly known as a steam shovel and the primary object of the invention is to provide novel means for causing the bottom of the shovel or bucket to be released for dumping the load, when the shovel or bucket has been moved to the desired position.

In the usual construction of tripping means for the bottom of the shovel or bucket, a trip rope is provided which extends along the boom into the engine house. The provision of this additional rope not only places additional work on the operator, but the rope often interferes with the proper operation of the shovel and during the movement of the shovel and the shovel arms, when slack is found to occur in this rope, which often catches in the wagons in which the material is being dumped.

It is therefore a prime object of this invention to provide an improved trip means for the bottom of the bucket or shovel, which can be automatically operated by the operator of the shovel, after the shovel has been disposed at the desired position.

Another prime object of the invention is to provide novel means for eliminating all slack in the trip or control cable during the movement of the shovel and shovel arms.

A still further object of the invention is to provide an improved attachment for steam shovels of the above character, which will be durable and efficient in use, one which will be simple and easy to manufacture, and one which can be incorporated with the excavating machine at a minimum cost.

With these and other objects in view the invention consists in the novel construction, arrangement and formation of parts, as will be hereinafter more specifically described and illustrated in the accompanying drawings, forming a part of this specification, in which drawings:

Figure 1 is a fragmentary side elevation of the excavating machine showing my improved trip mechanism incorporated therewith.

Figure 2 is a fragmentary rear elevation of the shovel arms and the shovel showing the means carried by the arms and shovel for actuating the trip.

Figure 3 is an enlarged side elevation of the device utilized for actuating the trip cable and for taking up and paying out the cable for eliminating slack therein.

Figure 4 is a front elevation of the device utilized for actuating the trip cable and for taking up and paying out the slack therein and illustrating the means utilized for connecting the drum thereof with the gear wheel utilized for operating the rack pinion.

Figure 5 is a detail perspective view of the parts utilized for actuating the rock shaft, which is connected with the trip carried by the bucket or shovel.

Figure 6 shows detailed perspective views of the parts utilized for operating the trip cable and for winding up and paying out the same during the movement of the shovel arms.

Figure 7 is a detail sectional view taken on the line 7—7 of Figure 3.

Referring to the drawings in detail, wherein similar reference characters designate corresponding parts throughout the several views, the letter A generally indicates the excavating means and B the novel trip mechanism for the shovel 10 thereof.

The excavating machine A is of the usual or any preferred type and as the same has merely been shown to illustrate the use of the improved invention, only parts thereof will be described which cooperate with the improved trip mechanism.

As shown the excavating machine A includes a platform 15 mounted upon the usual truck 16 and having disposed thereon the engine house 17. The platform 15 has also pivotally connected thereto in the usual way the boom 18, which slidably supports the arms 19. The arms 19 have associated therewith the bucket or shovel 10 having the usual hinged bottom 20.

The bucket or shovel arms 19 can be either disposed inside or outside of the boom 18 and as shown in the drawings the arms 19 extend through the boom 18. These arms are arranged in the ordinary manner and are provided with rack bars not shown which engage pinions not shown on the shipper shaft 21 which extends transversely of the boom 18. The outer end of the shipper shaft 21 has secured thereto in any preferred way the relatively large shipper gear wheel 22, which is operated by a pinion 23 connecting therewith. This pinion 23 is driven in any preferred way from suitable portions of the excavating machine.

An operating lever 24 is also mounted upon the platform 15 as clearly shown in Figure 1 of the drawings.

The rear end of the bottom 20 of the bucket 10 is provided with a rearwardly extending member 25, which is adapted to be engaged by a sliding latch bar 26 mounted in suitable guides 27 carried by the bucket. The latch bar 26 and the keeper 25 are of the ordinary construction, and this latch bar 26 is operated in a novel manner, which will be now described. As shown the shovel or shovel arms 19 support suitable bearings 30 in which is mounted a rock shaft 31. This rock shaft 31 has secured thereto a suitable pulley 32. A relatively short small cable 33 is connected at one end to the pulley and at its upper end to an eye carried by the latch bar.

The outer end of the rock shaft 31 has keyed or otherwise secured thereto a crank arm 35. The outer end of the crank arm has attached thereto the trip cable 36, which will be hereinafter more fully described. In order to eliminate slack within the cable 36 a contractile coil spring 37 has one end secured to the crank arm and its opposite end to a suitable eye 38 supported by a bracket 39 secured to one of the shovel arms 19.

I have provided a device designated broadly by the reference character C for bringing about the actuation of the trip cable 36 and for winding up or paying out the trip cable during the movement of the shovel arms 19 to prevent any slack within the trip cable.

As shown, this means comprises a drum 40, with its intermediate portions provided with spiral grooves 41 for the reception of the trip cable and one end of the trip cable can be suitably secured thereto. The opposite ends of the drum 40 are left smooth however to provide bearing portions 42. A casting 43 is provided which embodies a pair of arms 44 connected by a transverse bridge piece 45. The free ends of the arms 44 are curved arcuately to provide downwardly and rearwardly extending horns which terminate in bearings 46, for a purpose which will be hereinafter more fully described. One of the arms 44 is provided with an extension 47 beyond its bearing 46 and the extension is provided with a laterally extending lug 48, to which is attached a pull rope 49 which also will be hereinafter more fully described. The inner ends of the arms 44 terminate in relatively large bearings 50 which rotatably receive the drum 40. It is obvious that the smooth portions 42 of the drum are mounted within the bearings 50.

Rockably mounted on the smooth portions 42 of the drum 40 outward of the bearings 50 are disposed a pair of arms 51 and 52 which are also provided with enlarged central bearings 53 for receiving the drum. The arm 52 carries a diametrically extending strap 54 which extends across the enlarged bearing 53 and as shown this strap is provided with an axially disposed opening 55 and a pair of spaced openings 56 which are arranged on opposite sides of the axial opening 55. The arms 51 and 52 are provided with radially extending extensions 57 which terminate in eyes or bearings 58 for supporting a cross shaft 59 on which is rotatably and slidably mounted a pulley or sheave wheel 60. The bearings 53 diametrically opposite to the arms or extensions 57 are provided with inwardly extending laterally directed attaching ears 61 which are provided with strengthening flanges 62 at their sides and connecting flanges 63 at their inner ends. The connecting flanges 63 are adapted to abut and are connected together by suitable bolts 64. As shown the attaching ears 61 extend over the bridge piece 45 of the casting 43 and the bearings 53 are disposed in direct alignment with the bearings 50 and thus it can be seen that the drum 41 is freely rotatable within the bearings 50 and the bearings 53 and that the arms 51 and 52 are free to rotate together about the drum and about the casting 43. The casting 43 is also freely rotatable about the drum and in relation to the arms 51 and 52. If so desired the casting 43 can have formed on the arms 44 suitable stops for limiting the swinging movement of the arms 51 and 52 thereon.

The aligned eyes or bearings 46 carried by the arcuate arms or horns 44 of the casting 43 support a cross shaft 65 on which is slidably and rotatably mounted a pulley or sheave 66.

The arm 52 slidably carries an adjustable bar 67 provided at one face with a longitudinally extending groove 68 which fits over the strap 54. The grooved portion of the bar 67 is provided with a longitudinally extending slot 69 the purpose of which will be hereinafter more fully described. The lower end of the bar 67 is provided with an opening 70 which is adapted to support a short stub shaft 71 on which is mounted a guide pulley or sheave 72. As clearly shown in the detailed views of Figure 6 the drum 40 is provided with a diametrically extending brace 73 which is provided with an axially disposed opening 74. A short stub shaft 75 extends through the opening 74, the opening 55 and the slot 69 and forms means for uniting the drum, the arms 51 and 52 and the bar 67 together. The openings 56 carry bolts 76 which extend through the slot 69 and it can be seen that by loosening the nuts on the bolts 76 that the bar 67 can be adjusted longitudinally of the arm 52 for moving the pulley wheel 72 toward and away from the arcuate arms or horns 44, for a purpose, which will also be hereinafter more fully described.

In order to permit the connection of the drum 40 with the relatively large gear wheel 22 heretofore described a connecting sleeve 80 is provided. This sleeve at one end is provided with an apertured attaching flange 81 which is bolted to the hub of the gear wheel 22 as indicated by the reference character 82. The sleeve 80 extends through the bearing 53 of the arm 51 into the casting 43 and into the drum 40 and is rigidly secured thereto by suitable set screws 83.

This form of connection is used when the arms 19 for the bucket 10 extends through the boom 18, but when the arms 19 extend on the outside of the boom and a saddle block is used therefor a slightly modified form of means will be utilized. It is also apparent that if the diameter of the sleeve 80 is such as to not make a snug fit with the interior of the drum 40 that a filler sleeve can be placed around the sleeve 80.

As clearly shown in Figure 1 of the drawing, trip cable 36 extends upwardly from the crank arm 35 along one side of the dipper arms 19 and is trained over the guide pulley or sheave 66 and under the guide pulley or sheave 60 and then about the drum 40 and secured thereto in any prefererd way.

The pull rope 49 is connected to the operating lever 24 or the latch thereof and is trained about the pulley or guide wheel 72 and secured to the laterally extending lug 48 carried by the casting 43 in any preferred way, as clearly shown in Figure 3 of the drawings.

Now in operation of the improved device, when the bucket 10 contains the desired load, the same is hoisted in the desired manner and placed over the desired point, the operating lever 24 is manipulated, which will draw down on the pull rope 49. This will swing in on the pulley 72 causing the arms 51 and 52 and the bar 67 to rotate about the stub shaft 75 and and about the drum 42 and will cause the casting 43 to swing in an opposite direction about the drum thus swinging the pulley or guide sheave 66 outwardly and upwardly. During the swinging of the arms 51 and 52 the pulley wheel 60 of course is swung downwardly and inwardly and the swinging of these pulleys 66 and 60 will cause a tension on the trip cable 36 which will pull up on the crank arm 35 thus lifting up the latch 26 and releasing the bottom of the shovel 10. Thus the load will be dumped.

It is obvious that during the raising and lowering of the bucket arms 19 that the drum 40 will be rotated with the large gear wheel 22 and thus this trip cable 36 will be automatically payed out or wound up, according to the direction of movement of the arms. This will obviate all slack in the cable. It is desirable to have the drum 40 of the same diameter as the pinions utilized for engaging the rack carried by the arms 19 for raising and lowering the arms so that the amount of cable taken in or payed out the drum will be the same as the movement of the arms.

As soon as the bottom 20 of the bucket 10 has been released, the operating lever 24 is actuated, and the tension on the cable 36 will be such as to automatically return the casting 43 and the arms 51 and 52 to their normal position and the latch 26 to automatically return to its normal position in the ordinary manner.

From the foregoing description it can be seen that an efficient means has been provided for operating the latch of the shovel or bucket of an excavating machine without causing any slack within the trip or releasing cable.

It is obvious that certain minor changes can be made in the construction and relation of the various parts of the device without changing the scope thereof.

What I claim as new is:

1. In an excavating machine, the combination of a platform, a lever carried by the platform, a boom carried by the platform, dipper arms slidably carried by the boom, a gear wheel carried by the boom for cooperation with the dipper arms for sliding the same on the boom, a drum secured to the gear wheel for rotation therewith, a bucket carried by the arms having a hinged bottom, a trip latch for the bottom, and a trip cable for the latch connected therewith and trained about said drum, and means for operating the trip cable from the platform.

2. In an excavating machine, the combination of a platform, an operating lever carried by the platform, a boom carried by the platform, dipper arms slidably carried by the boom, a bucket carried by the arms having a hinged bottom, a sliding latch for the bottom, means including a gear wheel for sliding the arms on the boom, a drum rigidly connected with the gear wheel for rotation therewith, a trip cable connected with the latch and wound about the drum, and means operated by the lever for actuating the trip cable for releasing said latch.

3. In an excavating machine, the combination of a platform, a boom, dipper arms slidably carried by the boom, a bucket carried by the arms having a hinged bottom, a latch for the bottom, means for sliding the arms on the boom including a gear wheel, a drum secured to the gear wheel for movement therewith, a trip cable connected to the latch and with the drum, and a pair of oppositely swinging members mounted upon the drum, for engaging the opposite sides of the cable, and means for synchronously operating said oppositely swinging members from the platform for causing the actuation of said cable.

4. In an excavating machine, the combination of a platform, a boom, dipper arms slidably carried by the boom, a bucket carried by the arms having a hinged bottom, a latch for the bottom, means for sliding the arms on the boom including an operating gear wheel, a drum secured to the gear wheel for movement therewith, a trip cable connected to the latch and with the drum, spring means for normally holding the cable under tension, a pair of rockably swinging members carried by the drum for engaging opposite sides of the trip cable, a pull rope engaging said members and means for operating the pull rope from the platform for causing the swinging of said members against said trip cable to cause the releasing of said latch.

5. In an excavating machine, the combination of a platform, a boom, dipper arms slidably carried by the boom, a bucket carried by the arms having a hinged bottom, a latch for the bottom, means for sliding the arms on the boom including an operating gear wheel, a drum secured to the gear wheel for movement therewith, a trip cable connected to the latch and with the drum, spring means for normally holding the cable under tension, a pair of rockably swinging members carried by the drum for engaging opposite sides of the trip cable, a pull rope engaging said members, means for operating the pull rope from the platform for causing the swinging of said members against said trip cable to cause the releasing of said latch, and a sliding bar carried by one of said members for adjusting the tension of said pull rope.

6. In an excavating machine, the combination of a platform, a boom, dipper arms slidably carried by the boom, a bucket carried by the arms having a hinged bottom, a sliding latch for the bottom, means for sliding the dipper arms on the boom including a gear wheel, a drum secured to the gear wheel for rotation therewith, a trip cable connected with the drum and with the latch, a casting rockably mounted on the drum including a pair of arcuately disposed arms, a shaft carried by the casting, a pulley wheel slidably and rotatably mounted upon the shaft, a pair of arms rockably mounted upon the drum and movable in relation to the casting, a shaft carried by the last mentioned arms, a pulley slidably and rotatably mounted upon the last mentioned shaft, the pulleys engaging the opposite sides of the trip cable, a bar adjustably carried by one of the arms, a guide cable carried by the bar, a pull rope trained about said last mentioned pulley and connected to the cable, and means for operating the cable from the platform.

In testimony whereof I affix my signature in presence of two witnesses.

FRANK W. SCHULTE.

Witnesses:
CHAS. W. OWENS,
LESTER G. PARRISH.